(12) United States Patent
Davenport et al.

(10) Patent No.: US 10,305,847 B2
(45) Date of Patent: *May 28, 2019

(54) STRUCTURING NOTIFICATION OF EVENTS TO USERS IN A SOCIAL NETWORKING SYSTEM

(71) Applicant: Facebook, Inc., Menlo Park, CA (US)

(72) Inventors: Benjamin Peter Davenport, Palo Alto, CA (US); Lucy Congyun Zhang, Palo Alto, CA (US); Jonathan David Perlow, San Francisco, CA (US); Justin Alexander Shaffer, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/162,596

(22) Filed: May 23, 2016

(65) Prior Publication Data

US 2016/0269346 A1  Sep. 15, 2016

Related U.S. Application Data

(63) Continuation of application No. 13/624,433, filed on Sep. 21, 2012, now Pat. No. 9,356,902.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/14* (2013.01); *H04L 51/16* (2013.01); *H04L 67/22* (2013.01)

(58) Field of Classification Search
CPC ...... G06Q 50/01; G06Q 10/1095; H04L 51/32
USPC ......................................... 709/206
See application file for complete search history.

(56) References Cited

U.S. PATENT DOCUMENTS

| | | | |
|---|---|---|---|
| 8,260,321 B1 * | 9/2012 | Dunko | H04W 4/02 455/456.3 |
| 2007/0233736 A1 | 10/2007 | Xiong et al. | |
| 2008/0098087 A1 | 4/2008 | Lubeck | |
| 2009/0055236 A1 | 2/2009 | O'Sullivan et al. | |
| 2009/0182589 A1 | 7/2009 | Kendall et al. | |
| 2010/0017714 A1 | 1/2010 | Agarwal et al. | |

(Continued)

OTHER PUBLICATIONS

United States Office Action, U.S. Appl. No. 13/624,433, dated Jul. 13, 2015, twenty-six pages.

(Continued)

*Primary Examiner* — Tauqir Hussain
(74) *Attorney, Agent, or Firm* — Fenwick & West LLP (57) ABSTRACT

A social networking system identifies an event based on a thread including messages from users of the social networking system and communicates invitations to the event to one or more invited users. The social networking system receives a response to an invitation from a responding user and identifies a group of users invited to the event that have not responded to the invitation. From the users invited to the event that have not responded to the invitation, a subset of users having a threshold affinity to the responding user are selected. The social networking system notifies the subset of users of the responding user's response to the invitation and may also provide the subset of users with a suggestion for attending the event.

20 Claims, 4 Drawing Sheets

(56) References Cited

U.S. PATENT DOCUMENTS

| | | |
|---|---|---|
| 2010/0130226 A1 | 5/2010 | Arrasvuori et al. |
| 2010/0325205 A1 | 12/2010 | Murphy et al. |
| 2011/0072125 A1* | 3/2011 | Quoc .................. G06Q 10/02 709/223 |
| 2011/0145698 A1 | 6/2011 | Penov et al. |
| 2011/0252097 A1 | 10/2011 | Walker et al. |
| 2011/0258013 A1* | 10/2011 | Groves ............... G06Q 10/109 705/7.18 |
| 2012/0143964 A1* | 6/2012 | DeLuca ................ H04L 51/32 709/206 |
| 2012/0166532 A1 | 6/2012 | Juan et al. |
| 2012/0203846 A1 | 8/2012 | Hull et al. |
| 2012/0239466 A1 | 9/2012 | Hu et al. |
| 2012/0324589 A1 | 12/2012 | Nukala et al. |
| 2012/0331063 A1 | 12/2012 | Rajaram |
| 2013/0103758 A1 | 4/2013 | Alison et al. |

OTHER PUBLICATIONS

United States Office Action, U.S. Appl. No. 13/624,433, dated Oct. 31, 2014, twenty-one pages.

\* cited by examiner

STRUCTURING NOTIFICATION OF EVENTS TO USERS IN A SOCIAL NETWORKING SYSTEM

CROSS-REFERENCE TO RELATED APPLICATIONS

This application is a continuation of co-pending U.S. patent application Ser. No. 13/624,433, filed on Sep. 21, 2012, which is hereby incorporated by reference in its entirety.

BACKGROUND

This disclosure relates generally to social networking systems, and more particularly to structuring notifications of plans and events of a user of a social networking system to other users of the social networking system.

Social networking systems provide an environment for their users to easily connect to and communicate with each other. Different social networking systems provide various mechanisms to allow this user interaction, including tools and/or functionality allowing users to schedule and coordinate activities or events including groups of users. Similar to conventional calendaring or scheduling tools, calendaring functionality provide by a social networking system allows users to create an event, invite others, and track invitee attendance. For example, a social networking system calendaring tool distributes invitations, receives RSVPs from invitees, and notifies invitees of which invitees have accepted, declined, or indicated that they might attend. To distribute invitations, and track invitees, a calendaring tool may use any suitable communication channel, such as use instant messaging, e-mail, or short message service (SMS).

In addition to allowing users to schedule activities or events, calendaring tools of a social networking system provide a socializing function by informing users of activities of other users to whom they are connected. For example, a calendaring tool shares invitations using a social networking system. In addition to sharing invitations, the calendaring tool may socialize invitee tracking with users of the social networking system. For example, the calendaring tool shares with invitees the number invitations accepted, declined, or indicated as a "maybe" by various social networking system users. Further integration with the social networking system app may also be provided by the calendaring tool.

But conventional online calendaring tools often fail to leverage social information in a manner that helps an invited user decide whether to attend an activity or event that may be of interest to the invited user. Specifically, conventional online calendaring tools fail to apply information regarding the social interactions between social networking system users to help an invited user decide whether to accept an invitation, to decline an invitation, or to remain undecided. Additionally, while conventional online calendaring tools are suitable for planning an event well in advance, they are typically inadequate for organizing a more extemporaneous plan between social networking system users.

SUMMARY

A social networking system allows its users to facilitate personal interaction by creating events that specify one or more of a location, time, activity, and one or more users associated with the event. For example, when creating an event, a user may invite other users to a particular location at a particular time. To encourage users invited to an event to attend the event, the social networking system structures invitations to the event and notifies users who have been invited to the event of other users' responses to invitations.

An event, or a request to invite users to an event, may be generated based on communications between an inviting user and other users via the social networking system. Communications between users may be grouped into a thread including a plurality of messages and an event definition may be extracted from the content of messages in the thread. For example, one or more of a time, a location, and a group of users from a conversation thread are identified from a conversation thread and used to generate an event or to retrieve data associated with an event corresponding to the identified information.

After an event is created in the social networking system, social networking system users are able interact with the event in a variety of ways. For example, users may accept an invitation to the event, comment on the event, invite other users to the event, or perform other actions associated with the event. To increase the likelihood that a user invited to the event will attend the event, the social networking system may send a notification to invited users who have not accepted an invitation to the event, where the notification says that certain users to whom the non-accepting user has a high affinity have accepted an invitation to the event. This allows the social networking system to encourage users to attend the event because their close friends have done so. The social networking system may also provide an invited user with information about other responses to invitations from users identified by the invited user or based on the affinity between users providing a type of response to an invitation and the invited user.

To promote attendance at the event, the social networking system may respond to users accepting an invitation to the event differently than to users declining an invitation to the event. The social networking system may notify users invited to an event when another user invited to the event accepts an invitation to the event, thereby allowing invited users to readily identify other users attending the event. For example, the social networking system publishes invitation acceptances to an event wall (or page) associated with the event or includes stories identifying users accepting invitations in news feeds generated for other users invited to the event. The social networking system may also prompt users declining an invitation to the event to provide an additional message explaining the declination to a user hosting the event and/or to a user inviting the user declining the invitation. This additional, more personalized, communication to specific users may reduce the likelihood of users declining invitations to an event.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
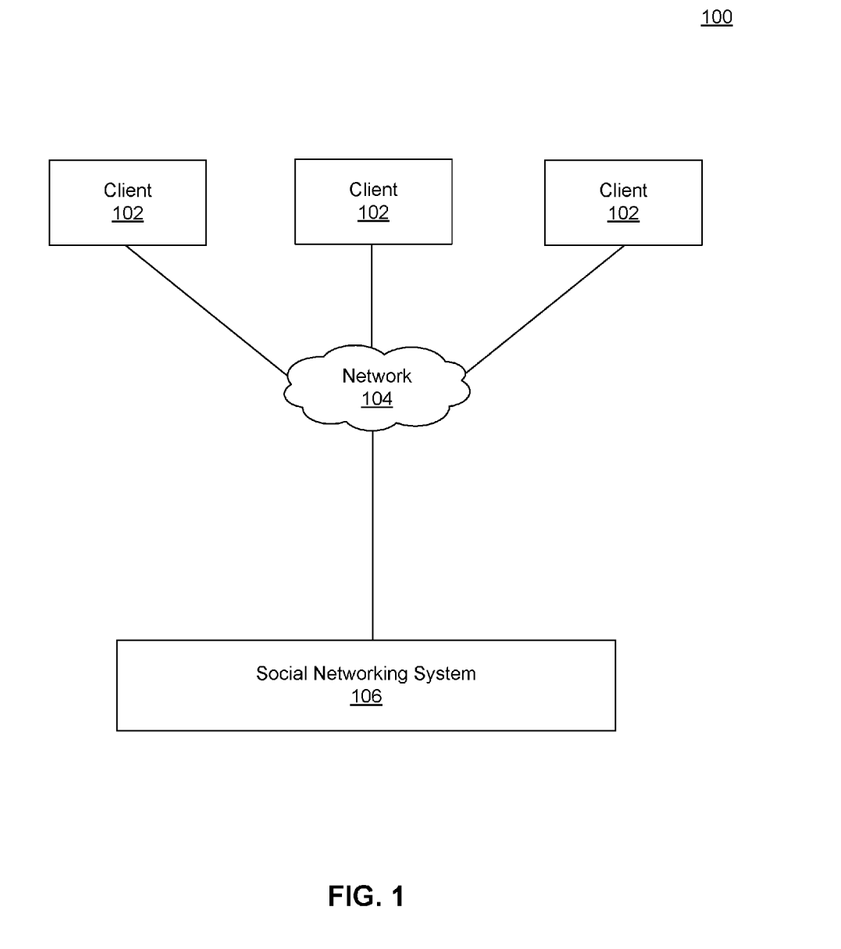
FIG. 1 is a block diagram of a system environment for providing information about an event to users of a social networking system, in accordance with an embodiment.

System for Structuring Notifications of Plans and Events to Users in a Social Networking System FIG. 1 is a network diagram of one embodiment of a system environment 100 used to create an event, and structure notification of the event in a social networking system using information about the affinities between a group of invited users. The system environment 100 includes one or more client devices 102, network 104, and social networking system 106. For purposes of illustration, system environment 100 shown by FIG. 1 includes three client devices 102. System environment 100, however, may include greater than or less than three client devices 102.

Client device 102 comprises one or more computing devices capable of processing data as well as transmitting and receiving data via network 104. For example, client device 102 may be a desktop computer, a laptop computer, a smart phone, tablet computing device, or any other device including computing functionality and data communication capabilities suitable for exchanging data with social networking system 106 over network 104. Network 104 may comprise any combination of local area and/or wide area networks, mobile, or terrestrial communication systems.

Social networking system 106 comprises one or more computing devices storing a social graph identifying a plurality of users, objects and connections between users and/or objects. The social graph also provides social networking system users with the ability to communicate and interact with other social networking system users. Social networking system 106 is further described below in conjunction with FIG. 2. In use, users join social networking system 106 and then add connections to a number of other users of social networking system 106 to whom they desire to be connected. As used herein, the terms "friend," "connection" or "associate" refers to any other user of social networking system 106 to which a user has formed a connection, association, or relationship via social networking system 106.

Social networking system 106 also allows users to create an event specifying a location, a time, an activity and/or one or more users associated with the event. For example, a social networking system user creates an event by inviting other users to a particular location at a particular time. As used herein, "event" may also refer to an informal plan specifying a subset of information included in an event; for example, a plan including a location and a time or a time and a group of users is also referred to herein as an "event." Hence, an event specifies one or more of a time, a location, an activity and/or one or more users. Additional information, such as a title, a description, photographs, images, videos or other data may also be associated with, or included in, an event.

In an embodiment, social networking system 106 creates and maintains an object associated with an event, which is used as a node in a social graph. This allows users, or other objects, to form connections with an event. In addition to creating an event, social networking system 106 may use information about its users to identify additional users to invite to the event or to modify presentation of information associated with an event to encourage users to attend the event. Modifying information about an event presented to users and identifying additional users to invite to the event is further described below in conjunction with FIGS. 3 and 4.

Social networking system 106 allows its users to explicitly add connections between other users and/or objects or may automatically create connections between users and/or objects based on common characteristics of the users or objects (e.g., users who are alumni of the same educational institution). For example, a user may specifically request to be a friend of an identified additional user. Connections in social networking system 106 are usually in both directions, but need not be, so the terms "user" and "friend" depend on the frame of reference. Connections between users of social networking system 106 are usually bilateral, or "mutual," but connections may also be unilateral, or "one-way." For example, if Bob and Joe are both users of social networking system 106 and connected to each other, Bob and Joe are each other's connections. If, on the other hand, Bob wishes to connect to Joe to view data communicated to social networking system 106 by Joe but Joe does not wish to form a mutual connection, a unilateral connection may be established. The connection between users may be a direct connection; however, some embodiments of social networking system 106 allow the connection to be indirect via one or more levels of connections or degrees or separation.

In addition to establishing and maintaining connections between users and allowing interactions between users, social networking system 106 provides users with the ability to take actions on various types of objects maintained by social networking system 106. These objects may include groups or networks (where "networks" here refer not to physical communication networks, but rather social networks of people, entities, and concepts) to which users or social networking system 106 may belong, events or calendar entries in which a user might be interested, computer-based applications that a user may use via social networking system 106, pages describing entities, advertisements or other suitable data or information. A user may interact with anything that is capable of being represented in social networking system 106 or coupled to the social networking system 106 via a network 104.

Social networking system 106 also includes user-generated content, which enhances a user's interactions with social networking system 106. User-generated content includes any data a user can add, upload, send, or "post," to social networking system 106. For example, a user communicates posts to social networking system 106 from client device 102. Posts may include status updates or other textual data, location information, photos, videos, links, music or other similar data and/or media. Content may also be added to social networking system 106 by a third-party through a "communication channel," such as a news feed or stream. Pieces of content may be represented as objects in social networking system 106. Hence, social networking system users are encouraged to communicate with each other by posting text and content items of various types of media through various communication channels, increasing the interaction of users with each other and with social networking system 106.

Social Networking Architecture

Figure 2:
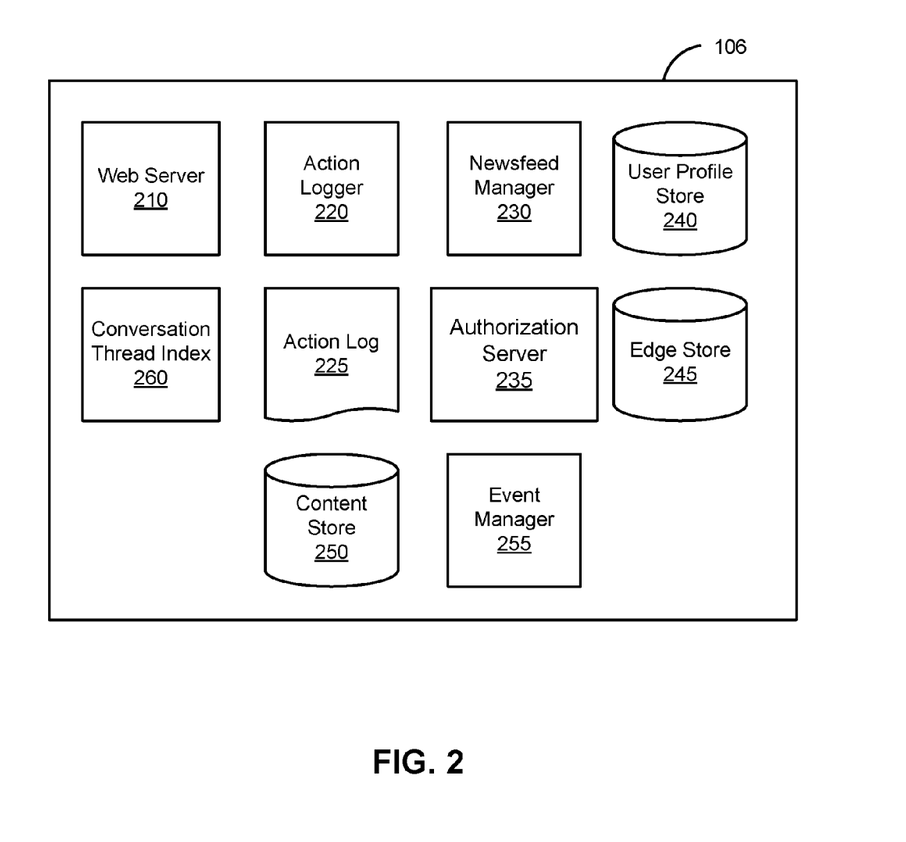
FIG. 2 is a diagram of a social networking system, in accordance with an embodiment.

FIG. 2 is a diagram of one embodiment of social networking system 106. The example social networking system 106 shown by FIG. 2 includes web server 210, action logger 220, action log 225, news feed manager 230, authorization server 235, user profile store 240, edge store 245, content store 250, and event manager 255. In other embodiments, social networking system 106 may include additional, fewer, or different modules for various applications. Conventional components such as network interfaces, security mechanisms, load balancers, failover servers, management and network operations consoles, and the like are not shown so as to not obscure the details of the system.

Social networking system 106 maintains a user profile for each of its users and stores the user profiles in user profile store 240. A user profile includes information about the user that was explicitly shared by the user, and may also include profile information inferred by social networking system 106. In one example, a user profile includes multiple data fields, each data field describing one or more attributes of the corresponding social networking system user. A user profile may include a variety of types of data, such as biographic, demographic, and other types of descriptive information, such as work experience, educational history, gender, hobbies or preferences, location and the like. A user profile may also store other information provided by the user, for example, images or videos. Information stored about images includes identification information (e.g., generated by tagging an image or video) of users of social networking system 106 displayed in an image. A user profile in user profile store 240 may also maintain references to actions by the corresponding user performed on content items in content store 250 and stored in action log 225.

A user profile object for a user may also include the user's affinity scores for objects in social networking system 106. An affinity score measures or indicates a user's affinity for an object in social networking system 106. Social networking system 106 determines affinity scores using anyone of several methods, including determining affinity scores based on the user's interactions with the specified object over time. In particular, affinity scores of the users for an object may be determined based on edges between connected objects or users including information describing the interactions between the user and object. Example embodiments of computing affinity scores are described in a related application, "Contextually Relevant Affinity Prediction in a Social Networking System," U.S. patent application Ser. No. 12/978,265, filed on Dec. 23, 2010, which is hereby incorporated by reference in its entirety. In other embodiments, social networking system 106 may also compute affinity scores based on the contextual information associated with messages exchanged among users of social networking system 106, as further described below in conjunction with FIGS. 3 and 4.

Social networking system 106 further stores data describing one or more connections between different users and other users or objects as edges in edge store 245. Some edges may be defined by users, allowing users to specify their relationships with other users. For example, users may generate edges with other users that parallel the users' real-life relationships, such as friends, co-workers, partners, and so forth. Users may select from predefined types of edges identifying different types of connections, or define their own edge types as needed. Other edges are generated when users interact with objects in the social networking system, such as expressing interest in a page on the social networking system, sharing a link with other users of the social networking system, and commenting on posts made by other users of the social networking system. Edge store 245 stores edge objects that include information about the edge, such as affinity scores for objects, interests, and other users. Multiple interactions between a user and a specific object may be stored in one edge object in edge store 245, in one embodiment. In some embodiments, connections between users may be stored in user profile store 240, or user profile store 240 may access edge store 245 to determine connections between users.

Action logger 220 receives communications from web server 210 about user actions on and/or off social networking system 106 and populates action log 225 with information about user actions. This allows social networking system 106 to track various actions taken by its users within social networking system 106 and external to social networking system 106. Any action that a particular user takes with respect to another user is associated with each user's profile through information maintained in action log 225 or in another suitable data repository. Examples of user actions within social networking system 106 include commenting on posts, sharing links, checking-in to physical locations via client device 102, accessing content items, creating an event, accepting an invitation to an event, commenting on an event or other interactions. Information describing these actions is stored in action log 220. Additional examples of interactions with objects on social networking system 106 included in action log 220 include commenting on a photo album, communications between users, becoming a fan of a musician, adding an event to a calendar, joining a group, becoming a fan of a brand page, authorizing an application, using an application and engaging in a transaction. When a user takes an action within social networking system 106, the action is recorded as an entry in action log 225. In an embodiment, social networking system 106 maintains action log 225 as a database.

Additionally, user actions taken outside of social networking system 106 may be identified by action logger 220 and stored in action log 225. For example, action logger 220 receives data describing a user's interaction with the third-party website that is separate from social networking system 106 from web server 210. Examples of actions where a user interacts with the third-party web site include a user expressing an interest in the third-party website or another entity, a user posting a comment to social networking system 106 that discusses the third-party website or a web page within the third-party website, a user posting to social networking system 106 a Uniform Resource Locator (URL) or other identifier associated with the third-party website, a user attending an event associated with the third-party website, or any other action by a user that is related to the third-party website. For example, website external to social networking system 106 may recognize a social networking system user through social plug-ins that enable an e-commerce website to identify the social networking system user. Because users of social networking system 106 are uniquely identifiable, e-commerce websites, such as this sporting equipment retailer, may use the information about these users as they visit their websites. Thus, action log 225 may include actions describing interactions between a social networking system user and the third-party website separate from social networking system 106 as well as actions taken by the social networking system user performed on a third-party website.

Content store 250 stores content objects. A content object may include any type of content maintained by social networking system 106, such as a page post, a status update, a photo, a video, a link, a shared content item, a gaming application achievement, a check-in event at a local business, and so on. Additional examples of content objects include events, pages, and other users, and applications installed on social networking system 106. Information used to create a content object may be obtained from sources external to social networking system 106, such as a third-party website. Different objects in content store 250 represent different items of content.

In one embodiment, content store 250 maintains instances of types corresponding to objects maintained by social networking system 106. Each object type has information fields are suitable for storing information appropriate to the type of object. When a new object of a particular type is created, social networking system 106 initializes a new data structure of the corresponding type, assigns a unique object identifier to it, and begins to add data to the object as needed. A new data structure may be initialized when data describing an activity is received from a user, when a new instance of an activity object is generated in content store 250, when a unique identifier is assigned to the activity object, or when information is received from the user or from a website to populate fields of an object.

When an inviting user creates an event using social networking system 106, an event object is created and stored in content store 250. The event object includes data received from the inviting user that describes the event. Examples of data included in an event object include a name or title of the event, a location for the event, a time for the event, one or more users associated with the event. The users associated with the event may be users invited to the event, users attending the event, users who have otherwise responded to an invitation to the event or a combination of the preceding. Invitations to the event are sent to users invited to the event, causing edges to be created from the event object to user profiles of the invited users. These edges are stored in the edge store 245 to describe a connection between the event, as represented by the event object, and the users invited to the event.

Data stored in connection store 245, user profile store 240, content store 250, and action log 225 allows social networking system 106 to generate a social graph identifying relationships between different users and/or social objects. As previously discussed, an edge between two nodes in the social graph represents a particular kind of connection between the two nodes, which may result from an action that was performed by one of the nodes on the other node. The nodes in the social graph correspond to user profiles or objects with the edges between the nodes representing connections or other relationships between the content associated with the nodes.

For example, if a first user establishes a connection with a second user in social networking system 106, user profiles of the first user and the second users from the user profile store 240 may act as nodes in the social graph. The connection between the first user and the second user stored by edge store 245 is an edge between the nodes associated with the first user and the second user. Continuing this example, the second user may then send the first user a message within social networking system 106, which is identified by action logger 220 and stored in action log 225. The stored action of sending the message is another edge between the two nodes in the social graph representing the first user and the second user. Additionally, the message itself may be identified from action log 225 and included in the social graph as another node connected to the nodes representing the first user and the second user.

When two users establish a connection in the social graph, they become "friends" (or, "connections"), allowing the connected users to more easily obtain information about each other. Being friends in a social networking system allows users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface.

Users may also interact with non-user objects within social networking system 106, including objects displayed on or contained within a social networking system page. This interaction may take a variety of forms, such as communicating with or about or commenting on an object, clicking a button or link associated with approval (such as a "like" button), sharing a social networking system object with other users, downloading or merely viewing a social networking system object, uploading an object, linking to an object, tagging an object, editing an object, playing an object, accessing an object, or by any other suitable means for interaction. Further, a user may interact with a group or fan page object by forming or joining groups, or becoming a fan of a fan page. Interactions with non-user objects may also be represented by edges connecting a user's node and an object node in the social graph.

Users may also interact with non-user objects external to social networking system 106. Social networking system objects external to social networking system 106 include content and application providers, such as media websites, merchant websites, and applications for media streaming service and online gaming. Interactions with non-user objects external to social networking system 106 include expressing preference for content external to the social networking system, sharing content external to the social networking system with other social networking system users, streaming music or video, playing an online game or performing any other suitable action. An edge may connect a node representing the user and a node representing the externally-hosted content or the external company website in the social graph.

Custom graph object types and graph action types may be defined by third-party developers as well as administrators of social networking system 106 to define attributes of the objects and actions used to form nodes and/or edges in the social graph. For example, an object for a movie may have several defined object properties, such as a title, actors, directors, producers, year, and the like. An action type, such as "purchase," may be used by a third-party developer on a website external (e.g., third party website) to social networking system 106 to report custom actions performed by users of social networking system 106. In this way, the social graph may be "open," enabling third-party developers to create and use the custom graph objects and actions on external websites.

News feed manager 230 selectively provides content to users of social networking system 106 and records the consumption of content by users. In operation, news feed manager 230 generates stories for a user describing actions taken by other members of the social networking system 106 to whom the user is connected and organizes these stories into a news feed to provide a user with an organized flow of information. A user's news feed includes information related to the activities of other users in the social networking system that are connected with the user. In one embodiment, the stories in a news feed for a user are ranked or ordered based on one or more factors, such as the user's affinities for objects, users and/or topics associated with the stories. For example, the news feed may include conversations discussing plans to attend an event between mutually connected users on the social networking system. The news feed may incorporate material external to the social networking system, for example links to web pages, videos, pictures, or audio files which other users of the social networking system have indicated as being interesting. The news feed may be tailored to the specific interests of the user, incorporating data related to their pattern of use of the social networking system. Alternatively, the news feed may be tailored based on the strength of the connection between items posted between two users of the social networking system. Items and activities presented in the news feed may be presented chronologically based on the order of their appearance in the social networking system, or ranked according to the predicted importance of the activities to the user.

A news feed generated by news feed manager 230 may include a story identifying an event created by a user of social networking system 106. A story in the generated news feed may also suggest an activity to a user based on an analysis of the content included in messages exchanged between users of social networking system 106. For example, as described below in conjunction with FIGS. 3 and 4, social networking system 106 identifies a set of participating social networking system users associated with messages included in the news feed or otherwise exchanged between users, analyzes content of the plurality of messages and suggests one or more activities to the participating users based on the analyzed content, such as attending an event. This allows stories in a news feed to identify events to other users and to communicate information about users attending events to social networking system users.

Authorization server 235 enforces one or more privacy settings of the users of social networking system 106. A privacy setting of a user determines how particular information, including news feed stories associated with a user can be shared. In one embodiment, a privacy setting specifies particular information associated with a user and the entity or entities with which the specified information may be shared. Examples of entities with which information can be shared may include other users, applications, third-party websites, or any entity that can potentially access the information. Examples of information that may be shared by a user comprises user profile information like profile photo, phone numbers associated with the user, user's connections, actions taken by the user such as adding a connection, changing user profile information and the like.

A privacy setting may be specified using different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information by a privacy setting can also be specified at various levels of granularity. Various sets of entities with which information can be shared may include, for example, all friends of the user, all friends of friends, all applications, all third-party websites or all external systems. Note that the various combinations of granularity of specification of information and the granularity of specification of entities with which information is shared are possible, i.e., all personal information may be shared with friends whereas all work information may be shared with friends of friends.

Conversation thread index 260 stores information about conversation threads. A conversation thread is a historical record of correspondence among a set of social networking system users. Each conversation thread includes a collection of electronic messages of various formats, including posts, web-chat messages, e-mails, and text messages. The messages may be received by social networking system 106 from a variety of communication channels. These communication channels include, for example, e-mail, chat, IM, and SMS. For example, a three-way conversation thread between Alice, Becky and Christy is created if Alice sends an e-mail to Becky and copies Christy. In another example, if Adam sends an online chat message to Bob and also separately sends and e-mail to Bob, and Bob sends an online chat message to Bob in response to receiving Adam's online chat message, conversation thread index 260 includes these communications in the same conversation thread (i.e., a thread including communications between Adam and Bob).

Conversation thread index 260 associates information about one or messages in a conversation thread with data in one or more of user profile store 240, action log 225, edge store 245 and/or content store 250. Information about a message includes information about the sender(s) and receiver(s), including biographical information and/or information describing interactions between the sender(s) or receiver (s) with social networking system objects. Information about a message may also describe the content of the message. For example, information describing the content of a message includes topical information describing the subject matter of the message. For example, social networking system 106 may associate a topic of "Cal Stanford football game" with a post "Going to the Cal-Stanford Big Game at Cal—6:30 pm" made by a social networking system user on a page of another social networking system user. Other information describing the content of a message in the conversation thread index store 260 may include geospatial and/or temporal information. For example, in the post "Going to the Cal-Stanford Big Game" described in the previous example, social networking system 106 may associate Memorial Stadium, UC Berkeley, and Berkeley, Calif. as locations associated in the message. Additional information about a message stored in the conversation thread index store 260 may also identify participants in the thread, a category associated with the thread, a state of the thread, timestamps of messages in the thread, an electronic message channel type associated with each message, as well as any other suitable type of information.

Event manager 255 determines an event described by or inferred from messages included in a conversation thread, and provides notifications about the event to users of social networking system 106. The notification may include an invitation to attend an event from an inviting user associated with the event. In an embodiment, event manager 255 accesses conversation thread index 260 and identifies conversation threads including messages describing an event including users of social networking system 106. From an identified conversation thread, for example, event manager 255 retrieves text, images, hypertext links, and geographic information associated with one or messages from the conversation thread. Event manager 255 may also access content store 250, edge store 245, user profile store 240 and/or action log 225 to identify users participating in a conversation thread, objects identified by messages in the conversation thread or other suitable information, or connections between users participating in the conversation thread. For example, event manager 255 may access information included in edge store 245 that describes interactions, such as check-ins, by a participating user at a comedy club described in a message from the inviting user.

Based on information included in connection store 245 and/or one or more of content store 250, edge store 245, user profile store 240 and/or action log 225, event manager 255 determines an activity from information associated with messages included in conversation threads. For example, event manager 255 analyzes conversation threads from messages in one or more threads in conversation thread index 260 and identifies information describing an event based on the messages. In an embodiment, event manger 255 applies a semantic analysis operation or a machine learning operation to identify keywords or phrases from messages and to map the keywords or phrases to one or more objects related to the keywords or phrases. For example, event manager 255 applies a semantic analysis operation or a machine learning operation to a message including the keyword "coffee" from a conversation thread to map the keyword "coffee" to one or more objects stored in content store 250 related to coffee, such as pages of an advertising user associated with coffee shops. Similarly, event manager 255 may also apply semantic analysis to identify phrases from messages and map identified phrases to topics to objects stored in content store 250. In one embodiment, event manager 255 identifies anchor terms included in messages and determines the meaning of the terms as further described in U.S. application Ser. No. 13/167,701, filed Jun. 24, 2011, which is hereby incorporated by reference in its entirety.

Event manger 255 may also use temporal and/or geographic information derived from content included in a message or metadata associated with a message to identify an event included in a message. For example, event manger 255 identifies temporal information, such as a time of day, date, month, year, etc. from the message content (e.g., "lunch at noon—Thursday August $9^{th}$—Fambrini's"). Similarly, event manager 255 may identify location information from the message content, such as check-in information including an address of a particular location. In one embodiment, event manager 255 may identify geographic and/or temporal information indirectly from a message. For example, event manager 255 determines temporal and/or location information from geographic information associated with a mobile device, or other device, used by the user to access social networking system 106. As an additional example, social networking system 106 may receive a user's location information from a third-party, such as a location-based service, or network provider by which the user accesses social networking system 106. Event manager 255 may invite or otherwise identify an event identified from a conversation thread using a story in a news feed generated by news feed manager 230, notification messages sent to a user or using other suitable communication channels.

Event manager 255 may structure information about an event created by a social networking system user or identified from a conversation thread sent to users associated with the event, such as other users invited to the event. For example, if a user invited to an event has not responded to an invitation to the event, event manger 255 may provide notifications to the invited user to encourage the uncommitted user to respond to the invitation request by indicating a plan to attend, or to possibly attend, the event. In one example, event manger 255 structures the notification to the uncommitted user so that the notification includes responses to invitations from other users planning to attend the event. The responses included in the notification may be selected so that an uncommitted user is notified of responses to invitations from invited users likely to influence the uncommitted user's decision whether to attend the event, such as users to which the uncommitted user has a high affinity or users with which the uncommitted user has previously attended other events.

In one embodiment, to select responses to include in a notification to an uncommitted user, event manger 255 computes a relationship score between the uncommitted user (i.e., a user included in a set of users invited to an event that have neither accepted nor declined an invitation to an event), and committed users and/or other objects associated with the event. Hence, the relationship score may be used by the event manager 255 to identify users responding to an invitation whose response is likely to influence the uncommitted user's response to the invitation. A relationship score may be based on a variety of factors, such as: the number of connections between the uncommitted user and other users invited to the event responding to an invitation, affinities between the uncommitted user and users invited to the event having responded to an invitation, affinities between the uncommitted user and objects associated with the event, types of connections between the uncommitted user and users having responded to an invitation, number of interactions between the uncommitted user and users having responded to an invitation, as well as other factors. Based on the relationship scores, event manager 255 identifies a subset of users and notifies the uncommitted user of the responses to an invitation to the event received from the subset of users. For example, users responding to an invitation having the highest relationship score or having a relationship score equaling or exceeding a threshold value are identified and their responses to the invitation are provided to the uncommitted user. This allows event manager 255 to increase the likelihood that a user will accept an invitation to an event by notifying the user when other users to whom the user has a strong social connection or relationship attend the event. This is further described below in conjunction with FIG. 3.

Event manager 255 may also modify distribution of user responses to an event invitation based on how different users respond to the invitation. For example, in addition to notifying an uncommitted user of one or more of responses as described above, activity manger 255 may also notify users responding to an invitation of one or more responses from other users responding to the invitation. Event manager 255 may also modify communication with a user declining an invitation to the event to encourage the declining user to reconsider attending the event. For example, rather than identify responses from users declining an invitation to users accepting an invitation, event manager 255 prompts a user declining an event invitation to provide a message to the user inviting the declining user to the event. Hence, responses declining an activity invitation are not readily accessible to multiple social networking system users, but are communicated to the user initiating the sending of the activity invitation. Modification of the distribution of activity invitation responses is further described below in conjunction with FIG. 4.

Web server 210 links social networking system 106 to one or more client devices 102 and/or to one or more third-party websites via network 104. Web server 210 serves web pages, as well as other web-related content, such as JAVA®, FLASH®, WL, and so forth. Web server 210 may include a mail server or other messaging functionality for receiving and routing messages between social networking system 106 and one or more client devices 102. The messages can be instant messages, queued messages (e.g., e-mail), text and SMS messages, or any other suitable messaging format.

Creation and Enhancement of Events

Figure 3:
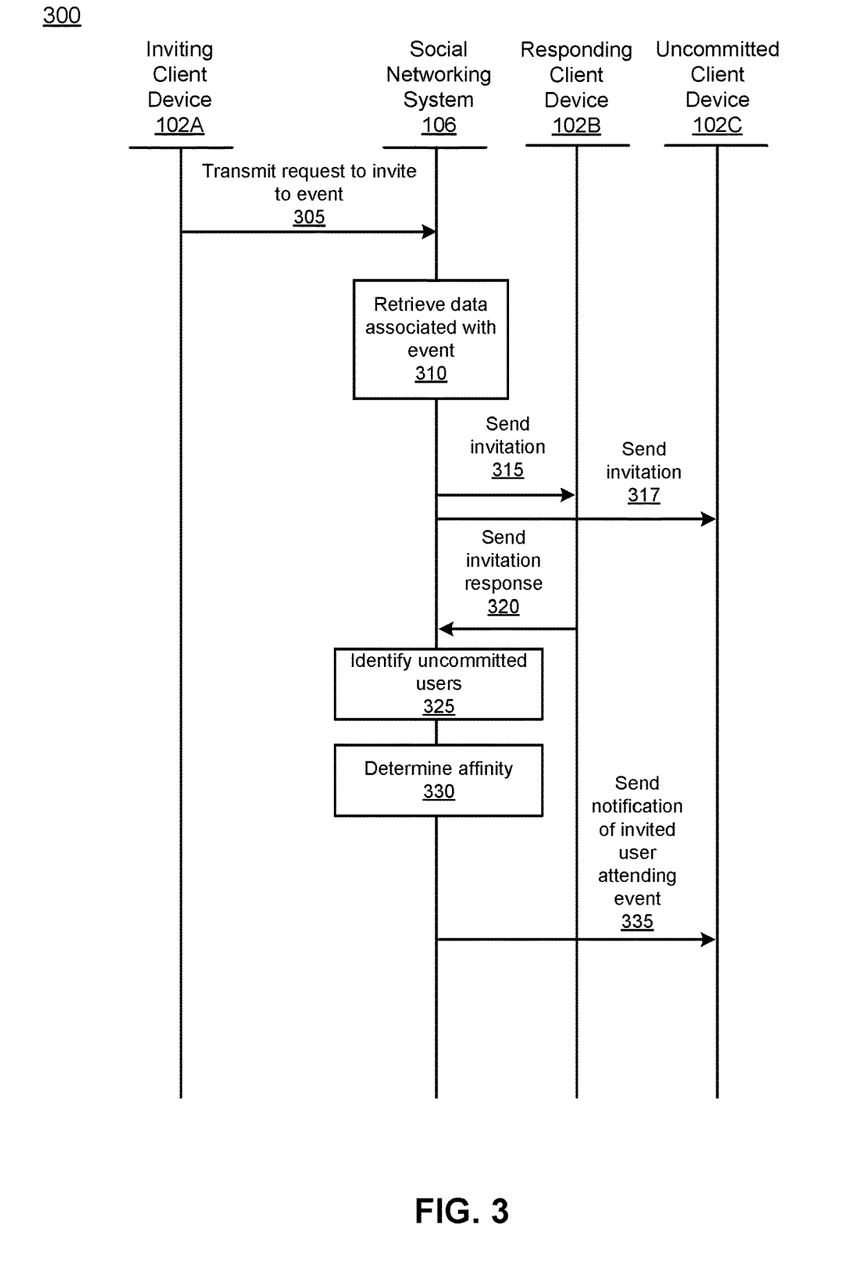
FIG. 3 is an interaction diagram of a method for notifying a social networking system user of other users attending an event, in accordance with an embodiment.

FIG. 3 is an interaction diagram of a method 300 for notifying a social networking system user of other users attending an event, using information stored in the social networking system regarding the relationship between various users invited to the event ("invitees"), to encourage users that have not responded to an invitation ("uncommitted users") to respond. Initially, a social networking system user transmits 305 a request to invite users to an event from inviting client device 102A to social networking system 106. The request to invite users may be a definition of a new event specifying one or more of a time, a location and/or one or more users invited to the event. Alternatively, the request to invite users may include information identifying an event stored by social networking system 106, such as an event identifier or other information for retrieving stored data associated with the identified event.

In one embodiment, the request to invite users to an event is generated from communications between the inviting user and other users via the social networking system 106. Social networking system 106 groups communications between the inviting user and other users via the social networking system into a thread including a plurality of messages and extracts an event definition from the messages. As described above in conjunction with FIG. 2, event manager 255 may identify one or more of: a time, a location and a group of users from a conversation thread and use the identified information to generate an event or to retrieve 310 data associated with an event corresponding to the identified information. For example, a common location, a common action or a common time are identified from the messages in the conversation thread and used to generate event data or to retrieve event data. In one embodiment, social networking system 106 identifies a set of users from the plurality of messages in a conversation thread and suggests one or more events to the set of users based on analyzing content of messages in the conversation thread and generating event descriptions or retrieving data about stored events. At least one of the identified users selects a suggested event, which acts a request to invite users to the selected event.

Social networking system 106 retrieves 310 data from content store 250 associated with an event specified by the request to invite users or generates event data based on the received request to invite users stored in content store 250. In one embodiment, event data is retrieved 310 or generated based on a time and a location from the request to invite users or from content store 250 based on data from content store 250 associated with the received request to invite users. From the event data in the request to invite users or from content store 250, social networking system 106 sends 315, 317 invitations to the event to users in the group of users invited to the event. For purposes of illustration, FIG. 3 shows social networking system 106 sending 315 an invitation to a client device of a responding user 102B and sending 317 an invitation to a client device of an uncommitted user 102C.

Responsive to receiving an invitation to the event, an invited user sends 320 a response to the invitation to social networking system 106. The response indicates whether the invited user will attend the event, will not attend the event or is undecided about attending the event. Social networking system 106 may distribute information about received invitation responses to entice users invited to the event but that have not responded to an invitation to attend the event. Users invited to the event but who have not responded to an invitation to the event, also referred to as "uncommitted users," are identified 325 by social networking system 106. For example, users invited to the event are identified and social networking system 106 identifies users invited to the event from which a response to an invitation has not been received. An affinity between an uncommitted user and a user responding to an invitation is determined 330 and used by social networking system 106 to determine whether to notify the uncommitted user of the responding user's response. For example, an affinity between an uncommitted user and a user responding that it will be attending the event is determined 330. An example of affinity determination is described above in conjunction with FIG. 2. In some embodiments, characteristics of the event may be used when determining 330 the affinities. For example, one or more of the time of the event, the location of the event and a type of the event may be used to modify the determined affinities. This allows the affinities to account for event-specific information to account for the uncommitted user's proximity to the event, availability at the time of the event or prior attendance of other events having a similar type. The affinities may also be modified based on proximity of the uncommitted user to the responding user, prior attendance by the uncommitted user and the responding user of prior events or other suitable information.

If the affinity between the uncommitted user and the user responding to the invitation equals or exceeds a threshold value, social networking system 106 sends 335 a notification of the responding user's response to the invitation to the user device associated with the uncommitted user 102C. As another example, affinities between the uncommitted user and users responding to invitations are determined 330 and used to rank users attending the event. The ranking is used to select responses to events that are included in notifications sent 335 to the uncommitted user.

In one embodiment, the notifications sent 335 to the uncommitted user include a recommendation about attending the event for the uncommitted user. The recommendation may be based on types of responses received from other invited users to which the uncommitted user has at least a threshold affinity. For example, if a specified percentage or number of invited users having a threshold affinity to the uncommitted user respond to an invitation that they will or may attend the event, the recommendation suggests that the uncommitted user attend the event. As another example, if a specified percentage or number of invited users having a threshold affinity to the uncommitted user respond to an invitation that they will not attend the event, the recommendation may suggest that the uncommitted user not attend the event. Using affinities between an uncommitted user and other users responding to the invitation allows social networking system 106 to notify an uncommitted user how other users having a social relationship with the uncommitted user have responded to an invitation to the event. This may increase the likelihood that the uncommitted user attends the event, encouraging additional interactions between social networking system users.

Figure 4:
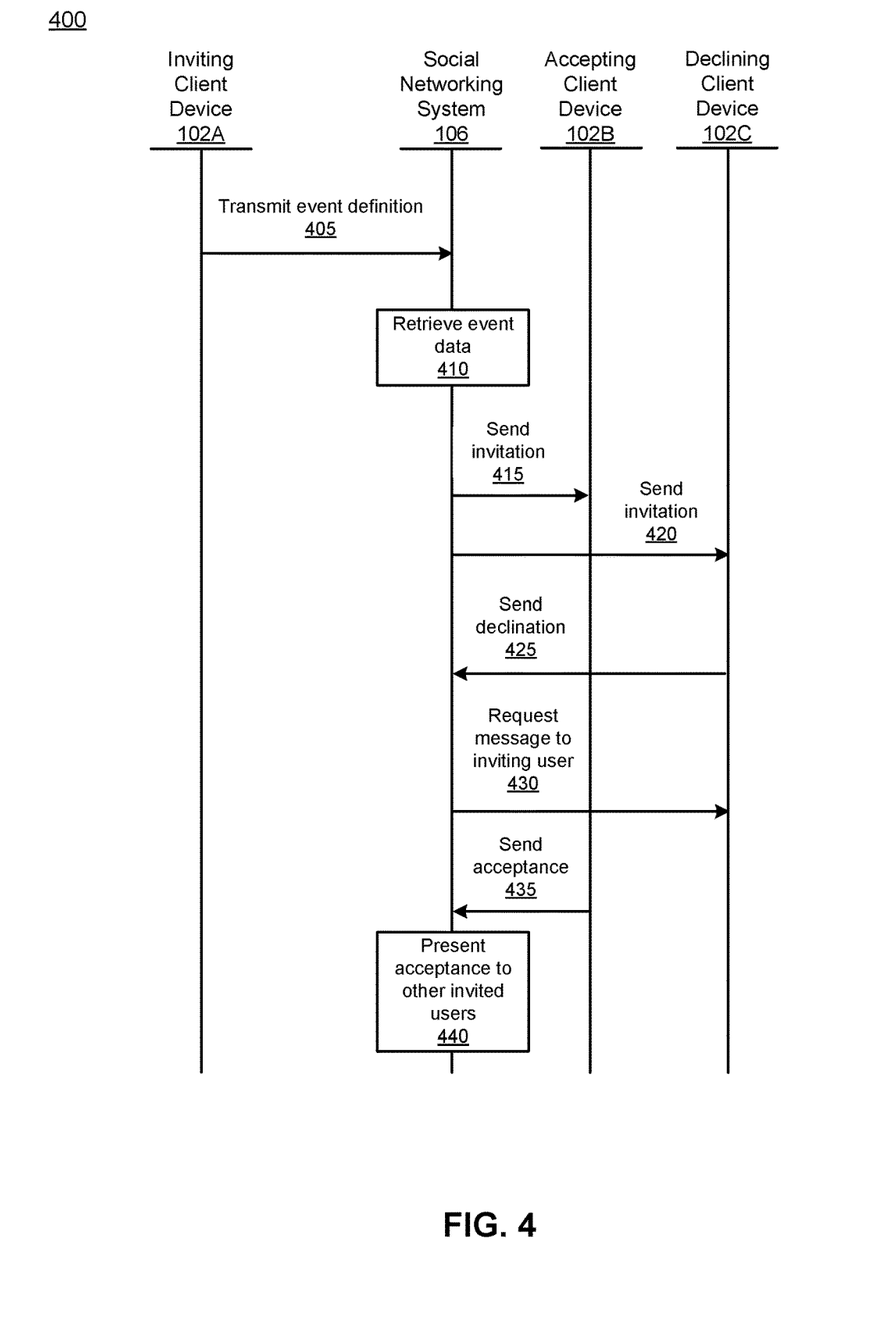
FIG. 4 is an interaction diagram of a method for receiving an indication of accepting or declining an invitation to an event, in accordance with an embodiment.

FIG. 4 is an interaction diagram of a method 400 for identifying users attending an event created using social networking system 106. As described above in conjunction with FIG. 3, a user inviting other users to an event (an "inviting user") transmits 405 a definition of an event from inviting client device 102A to social networking system 106. The event definition may be a definition of a new event specifying one or more of a time, a location and/or one or more users invited to the event. Alternatively, the event definition may include data for identifying an event stored by social networking system 106, such as an event title, an event description or other suitable identifying information. A request to invite users may include information identifying an event stored by social networking system 106, such as an event identifier or other information for retrieving stored data associated with the identified event.

In one embodiment, the request to invite users to an event is generated from communications between the inviting user and other users via the social networking system 106. Social networking system 106 groups communications between the inviting user and other users via the social networking system into a thread including a plurality of messages and extracts an event definition from the messages. As described above in conjunction with FIG. 2, event manager 255 may identify one or more of: a time, a location and a group of users from a conversation thread and use the identified information to generate an event or to retrieve 410 data associated with an event corresponding to the identified information. For example, a common location, a common action or a common time are identified from the messages in the conversation thread and used to generate event data or to retrieve event data. In one embodiment, social networking system 106 identifies a set of users from the plurality of messages in a conversation thread and suggests one or more events to the set of users based on analyzing content of messages in the conversation thread and generating event descriptions or retrieving data about stored events. At least one of the identified users selects a suggested event, which acts a request to invite users to the selected event.

Social networking system 106 retrieves 410 data from content store 250 associated with the event identified by the definition or generates event data based on the received event description that is stored in content store 250. In one embodiment, event data is retrieved 410 or generated based on a time and a location from the description of the event or based on data from content store 250 associated with the received description of the event. From the event data in the request to invite users or from content store 250, social networking system 106 sends 415, 420 invitations to the event to users in the group of users invited to the event. For purposes of illustration, FIG. 4 shows social networking system 130 sending 415 an invitation to a client device of an accepting user 102B and sending 420 an invitation to a client device of a declining user 102C. For purposes of illustration, FIG. 4 shows social networking system 106 sending 415 an invitation to a user device associated with a user accepting an invitation 102B and sending 420 an invitation to a user device associated with a user declining an invitation 102C.

In one embodiment, social networking system 106 also generates a page associated with the event, also referred to as an "event page." Social networking system users post content associated with the event to the event page, allowing users to ascertain information about the event by viewing the event page. For example, users may post comments or images to the event page, allowing other users to readily identify content relevant to the event. The event page my also identify how users have responded to invitations to the event, allowing users to identify other users planning to attend the event by viewing the event page.

In FIG. 4, the client device of a declining user 102C sends 425 a response declining the invitation to social networking system 106. Responsive to receiving the response declining the invitation, social networking system 106 requests 430 a message from the declining user to the user inviting the declining user to the event. By requesting 430 this additional communication between the declining user and the inviting user, social networking system 106 may decrease the likelihood of users declining an invitation. In some embodiments, social networking system 106 notifies the inviting user of the user declining the invitation and/or the user hosting the event of the declination but does not identify the user declining the invitation to other users invited to the event.

However, the client device of an accepting user 102B sends 435 a response accepting the invitation to social networking system 106, which presents 440 the acceptance to other users invited to the event. For example, a story identifying the accepting user and the acceptance of an invitation to the event is included in a news feed presented on the event page. Additionally or alternatively, notification messages, text messages, e-mails or other suitable communication channels may be used to present 440 the acceptance to other users invited to the event. This allows other users to more easily identify invited users attending the event, allowing users to readily identify other users attending the event when determining whether to accept an invitation. Similarly, responses to invitations indicating that an invited user may attend the event may be received and presented to other invited users by social networking system 106.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   communicating an invitation to an event maintained by a social networking system to one or more users of the social networking system invited to the event;
   receiving a response to the invitation to the event from a plurality of responding users included in the one or more users of the social networking system invited to the event;
   determining an uncommitted user from whom the social networking system has not received a response to the invitation to the event, the uncommitted user included in the one or more users of the social networking system invited to the event;
   determining an affinity between each of the plurality of responding users and the uncommitted user, the affinity between a responding user and the uncommitted user based on a number of historical interactions between the uncommitted user and the responding user;
   ranking the plurality of responding users based on the determined affinities;
   selecting a set of responding users of the plurality of responding users based on the ranking; and
   communicating a notification identifying the response to the invitation to the event received from the selected set of responding users from the social networking system to a user device associated with the uncommitted user.

2. The method of claim 1, wherein the response to the invitation to the event from a responding user is a confirmation of attendance of the event.

3. The method of claim 2, wherein the notification identifies the confirmation of attendance of the event received from the responding user and a recommendation for the uncommitted user to attend the event.

4. The method of claim 1, further comprising:
   receiving a thread comprising messages from users of the social networking system; and
   determining an event definition from the messages, the event definition including at least one of: a time of the event, a location of the event, and one or more users of the social networking system invited to the event.

5. The method of claim 4, wherein determining the event from the thread comprises:
   identifying a set of participating users of the social networking system associated with the messages comprising the thread;
   analyzing content of the messages comprising the thread;
   suggesting one or more events to the participating users based on the analyzed content; and
   receiving a selection of an event from at least one of the participating users.

6. The method of claim 5, wherein analyzing content of the messages comprising the thread comprises determining a common location from the messages comprising the thread.

7. The method of claim 5, wherein analyzing content of the messages comprising the thread comprises determining a common action from the messages comprising the thread.

8. The method of claim 5, wherein analyzing content of the messages comprising the thread comprises determining a common time from the messages comprising the thread.

9. The method of claim 1, further comprising determining affinities between each of the plurality of responding users and the uncommitted user based in part on the context of the event.

10. The method of claim 9, wherein the context of the event comprises one or more selected from a group consisting of: a time of the event, a location of the event, a type of the event, and any combination thereof.

11. The method of claim 1, wherein communicating the notification identifying the response to the invitation to the event received from the set of responding users from the social networking system to a user device associated with the uncommitted user comprises:
   communicating the notification to the at least one uncommitted user responsive to the response to the invitation having a specified type.

12. The method of claim 11, wherein the specified type comprises an acceptance of the invitation.

13. A computer program product comprising a non-transitory computer readable storage medium having instructions encoded thereon that, when executed by a processor, cause the processor to:
   communicate an invitation to an event maintained by a social networking system to one or more users of the social networking system invited to the event;
   receive a response to the invitation to the event from a plurality of responding users included in the one or more users of the social networking system invited to the event;
   determine an uncommitted user from whom the social networking system has not received a response to the invitation to the event, the uncommitted user included in the one or more users of the social networking system invited to the event;
   determine an affinity between each of the plurality of responding users and the uncommitted user, the affinity between a responding user and the uncommitted user based on a number of historical interactions between the uncommitted user and the responding user;
   rank the plurality of responding users based on the determined affinities;
   select a set of responding users of the plurality of responding users based on the ranking; and
   communicate a notification identifying the response to the invitation to the event received from the selected set of responding users from the social networking system to a user device associated with the uncommitted user.

14. The computer program product of claim 13, wherein the response to the invitation to the event from a responding user is a confirmation of attendance of the event.

15. The computer program product of claim 14, wherein the notification identifies the confirmation of attendance of the event received from the responding user and a recommendation for the uncommitted user to attend the event.

16. The computer program product of claim 13, wherein the non-transitory computer readable storage medium further has instructions encoded thereon that, when executed by the processor, cause the processor to:
   receive a thread comprising messages from users of the social networking system; and determine an event definition from the messages, the event definition including at least one of: a time of the event, a location of the event, and one or more users of the social networking system invited to the event.

17. The computer program product of claim 16, wherein determining the event from the thread comprises:
identify a set of participating users of the social networking system associated with the messages comprising the thread;
analyze content of the of messages comprising the thread;
suggesting one or more events to the participating users based on the analyzed content; and
receiving a selection of an event from at least one of the participating users.

18. A system comprising:
at least one processor; and
a non-transitory computer readable storage medium coupled to the processor and including instructions that, when executed by the processor, cause the processor to:
communicate an invitation to an event maintained by a social networking system to one or more users of the social networking system invited to the event;
receive a response to the invitation to the event from a plurality of responding users included in the one or more users of the social networking system invited to the event;
determine an uncommitted user from whom the social networking system has not received a response to the invitation to the event, the uncommitted user included in the one or more users of the social networking system invited to the event;
determine an affinity between each of the plurality of responding users and the uncommitted user, the affinity between a responding user and the uncommitted user based on a number of historical interactions between the uncommitted user and the responding user;
rank the plurality of responding users based on the determined affinities;
select a set of responding users of the plurality of responding users based on the ranking; and
communicate a notification identifying the response to the invitation to the event received from the selected set of responding users from the social networking system to a user device associated with the uncommitted user.

19. The system of claim 18, wherein the response to the invitation to the event from a responding user is a confirmation of attendance of the event.

20. The system of claim 19, wherein the notification identifies the confirmation of attendance of the event received from the responding user and a recommendation for the uncommitted user to attend the event.

* * * * *